United States Patent [19]

Namikoshi et al.

[11] 4,443,595

[45] Apr. 17, 1984

[54] CELLULOSE ESTER DERIVATIVES AND A PROCESS FOR THE PRODUCTION THEREOF

[75] Inventors: Hajime Namikoshi; Yoshiaki Okumura; Tsuyoshi Sei, all of Himeji, Japan

[73] Assignee: Daicel Chemical Industries Ltd., Osaka, Japan

[21] Appl. No.: 503,677

[22] Filed: Jun. 13, 1983

[30] Foreign Application Priority Data

Jun. 22, 1982 [JP] Japan ................................ 57-107825

[51] Int. Cl.$^3$ ............................................ C08B 15/00
[52] U.S. Cl. ......................................... 536/58; 536/56
[58] Field of Search ..................................... 536/58, 56

[56] References Cited

U.S. PATENT DOCUMENTS 2,310,729  2/1943  Bley ...................................... 536/58

Primary Examiner—Ronald W. Griffin
Attorney, Agent, or Firm—Hubbell, Cohen, Stiefel & Gross

[57] ABSTRACT

Novel cellulose ester derivatives having good solubility which are useful for coating agent, thickening agent, protective colloid, etc.; and a method for the preparation of said cellulose ester derivatives wherein cellulose is reacted with a specific lactone such as glycolide, lactide or ε-caprolactone in a solvent and in the presence of a catalyst for esterification.

11 Claims, 9 Drawing Figures

CELLULOSE ESTER DERIVATIVES AND A PROCESS FOR THE PRODUCTION THEREOF

BACKGROUND OF THE INVENTION

1. Field of the Invention

This invention relates to novel cellulose ester derivatives and a process for the production thereof. More specifically, it relates to cellulose ester derivatives useful for various uses such as coating agents, thickening agents etc.

2. Description of the Prior Art

Cellulose esters such as cellulose nitrate, cellulose acetate, cellulose propionate etc. are soluble in various solvents and are good in compatibility and miscibility with plasticizers and other polymers, and many of them exhibit thermoplastic properties by employing plasticizers, and therefore they are widely employed as molded products, fibers, coating agents etc. For producing these cellulose esters, it is general to react cellulose with an acid, an acid anhydride, an acid halide or the like employed as an esterifying agent. However, there has hitherto been known hardly any useful one which employs a lactone as an esterifying agent. Especially in this case, since the product is the one having free hydroxyl groups, i.e. a hydroxyalkyl ester of cellulose, it is expected to exhibit physical properties different from those of the aforesaid alkyl esters or inorganic acid esters of cellulose, and novel uses, for example, uses utilizing compatibility with hydrophilic polymers, are expected.

In this respect, for example, R. M. Reinhardt 5 [Text. Res. J. 26, 1 (1956)] obtained an esterified cotton fiber having improved resistance to microorganisms, felting properties, dyeing properties etc. by treating cotton with an alkali and β-propiolactone. However, this reaction production was not reported as being soluble in solvents. Furthermore, under these reaction conditions, a large amount of a homopolymer of β-propiolactone itself (ring opening polymerization) was obtained as a by-product.

The present inventors have been successful in efficiently effecting the esterification of cellulose by appropriately selecting the lactone as the esterifying agent and the reaction conditions, and have confirmed that they should be novel cellulose esters by solubilities, infrared spectra, NMR spectra etc., thereby having accomplished this invention.

One of the features of this invention is that novel compounds have been obtained by employing specific lactones such as glycolide, lactide or ε-caprolactone which is relatively poor in autogenous ring opening polymerizability as an esterifying agent. The aforesaid lactones poor in autogenous ring opening polymerizability are, in other words, the accordingly stable compounds, and thus they are also poor in esterification reactivity. The present inventors have succeeded in the esterification reaction with specific lactones by conducting the esterification reaction of cellulose in a uniform solvent system.

Japanese Patent Application Laid-Open No. 32501/1981 described a method for dissolving cellulose in N,N-dimethylacetamide, N-methyl-2-pyrrolidone or a mixture thereof in the presence of lithium chloride. The present inventors have further discovered that cellulose is also soluble in a mixture of lithium chloride and 1,3-dimethyl-2-imidazolidinone. One of the other features of this invention is that cellulose and a lactone are reacted in the aforesaid solvent system also in the presence of a basic compound. It has been observed that the reaction of this invention proceeds under relatively mild conditions and the product is completely soluble in water and in several hydrophilic organic solvents.

SUMMARY OF THE INVENTION

Accordingly, by this invention there is provided a cellulose ester derivative containing at least a moiety of the general formula (I):

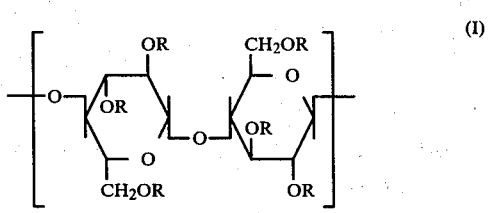

wherein at least one of R groups is either a group of the formula (II):

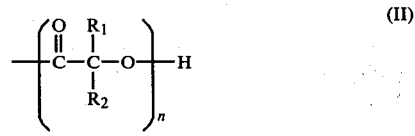

wherein $R_1$ and $R_2$ are independent from each other and each represents a hydrogen atom or a lower alkyl group and n represents an even number of 2-10; or a group of the formula (III):

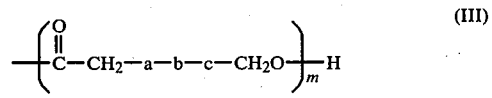

wherein a, b and c are independent from one another and each represents an oxygen atom or a methylene group, except the case where the oxygen atoms are adjacent to each other, and m represents an integer of 1-5; these groups optionally being present as a mixed ester, and the rest of the R groups represent hydrogen atoms.

Furthermore, in accordance with this invention, there is also provided a process for the production of a cellulose ester derivative which is characterized by reacting cellulose with a compound of the formula (IV):

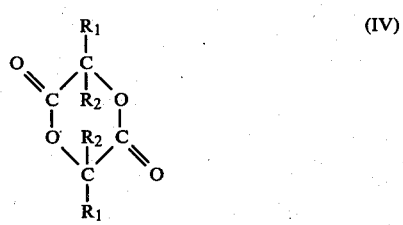

wherein $R_1$ and $R_2$ are independent from each other and each represents a hydrogen atom or a lower alkyl group; and/or a compound of the formula (V):

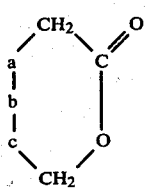 (V)

wherein a, b and c are independent from one another and each represents an oxygen atom or a methylene group, except the case where the oxygen atoms are adjacent to each other; in a solvent in the presence of an esterification promoting catalyst to obtain a cellulose ester derivative containing at least a moiety of the aforesaid formula (I).

DETAILED DESCRIPTION OF THE PREFERRED EMBODIMENTS

Figure 1:
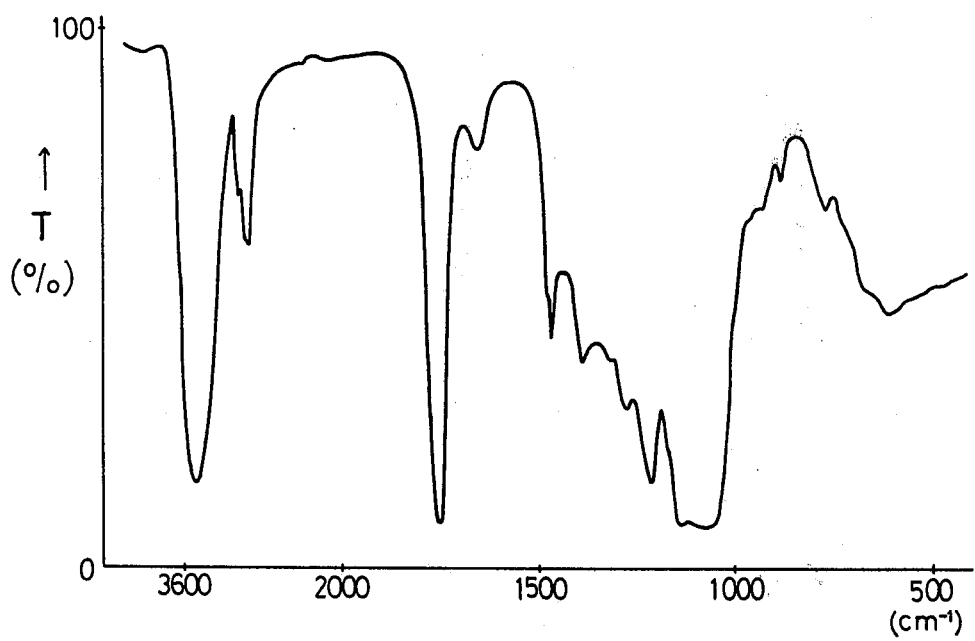
FIG. 1 shows an infrared absorption spectrum of the cellulose ester derivative of this invention obtained in Example 1.

In the formula (I) of the cellulose ester derivative of this invention, examples of the lower alkyl group for $R_1$ and $R_2$ in the formula (II) include alkyl groups of up to 4 carbon atoms, and a methyl group or an ethyl group is preferred. Specific examples of the groups represented by —a—b—c— in the formula (III) include groups —$CH_2$—$CH_2$—$CH_2$—, —$CH_2$—O—$CH_2$—, —O—$CH_2$—$CH_2$—, —O—$CH_2$—O— and —$CH_2$—$CH_2$—O—, among which the trimethylene group is preferred.

The degree of polymerization of the derivative of this invention is based on the substrate material, cellulose, and it is generally about 30–5000 (glucose units), preferably about 30–2500.

The number of the repeating units, n, in the ester group of the formula (II) is generally an even number and mostly 2, but sometimes that of up to about 10 may be also included from an aspect of autogenous ring opening polymerizability of lactides. Therefore, n is substantially an even number of 2–10, predominantly 2. However, in some cases, these repeating units are partially cleaved by the hydrolysis after the addition. Therefore, the partially containing ester moieties in which n is an odd number may be also included.

Similarly, the number of the repeating units, m, in the ester group of the formula (III) is substantially an integer of 1–5, predominantly 1.

The molar substitution of the group of the aforesaid formula (II) and/or formula (III) in the aforesaid cellulose ester derivative is generally 0.1–10 per glucose residue, and the degree of substitution of the substituent R in the formula (I) is 0.1–3.0, preferably 0.4–2.0 per glucose residue.

The derivative of this invention may be obtained by reacting cellulose with a compound of the above formula (IV) and/or a compound of the above formula (V) in a solvent in the presence of an esterification promoting catalyst.

Specific examples of the compound of the above formula (IV) include glycolide, lactide, 2-hydroxy-n-butyric acid cyclic dimer, 2-hydroxyisobutyric acid cyclic dimer etc. Among those, the glycolide and lactide are easily available and preferred. On the other hand, the compound of the formula (V) is preferably ε-caprolactone from a viewpoint of easy availability. In addition, various lactones disclosed in British Pat. Nos. 766,347 and 775,495 may also be employed.

As the cellulose is the substrate material of this invention, there may be employed usually available ones having a degree of polymerization of about 30–5000, preferably about 30–2500 (glucose units), and pulps from the soda process, the sulfate process, the sulfite process etc. and purified products thereof may be employed.

The solvent is preferably a mixed solvent of N,N-dimethylacetamide, N-methyl-2-pyrrolidone or 1,3-dimethyl-2-imidazolidinone or a mixture thereof mixed with lithium chloride, and also solvents capable of uniformly dissolving cellulose and the esterifying agent may be employed. As the esterification promoting catalyst, basic compounds, for example, alkali metal hydroxide such as sodium hydroxide, potassium hydroxide, lithium hydroxide etc. and amines such as pyridine, picoline, trimethylamine, triethylamine etc. may be employed.

In the above-described production process, the ratio of the cellulose to the esterifying agent to be used may be determined according to the desired degree of esterification; the reaction may be conducted by using the compounds of the formulae (IV) and/or (V) in slightly excess amounts and it is not necessary to add these in large excess amounts. The amount of the esterification accelerating catalyst to be added is, for example, 0.5–20% by weight. The aforesaid esterification reaction is generally effected at ambient temperature to 80° C. for about 1–20 hours in the above mixed solvent.

By such a reaction, the esterifying agents of the formulae (IV) and (V) are reacted with the hydroxyl groups of the cellulose to form the derivative of the aforesaid formula (I), which is then appropriately purified to give the cellulose ester derivative of this invention.

The novel cellulose ester derivatives obtained in this invention are soluble in water or dimethyl sulfoxide, N,N-dimethylformamide, N,N-dimethylacetamide, N-methyl-2-pyrrolidone etc. and have a thickening effect and thus may be employed as coating agents, thickening agents, protective colloids etc. or they may also be applied in the paint field by reacting with isocyanates.

Examples of this invention are illustrated below but it should be noted that this invention is not limited by these examples.

EXAMPLE 1

23.8 g of microcrystalline cellulose (degree of polymerization: about 200) produced by treating a sulfite process pulp comprising 93.5% of α-cellulose with 0.44% hydrochloric acid at 125° C. for 60 minutes followed by purification was charged into a separable flask equipped with a reflux condenser and 344.9 g of N,N-dimethylacetamide was added. This mixture was stirred at 165° C. for 30 minutes, allowed to cool down to 100° C., upon which 27.3 g of anhydrous lithium chloride was added with stirring. This mixture was cooled down to room temperature with stirring, by which the cellulose was completely dissolved and became a clear solution.

2.33 g of lactide ($C_6H_8O_4$) was dissolved in 29.7 g of this cellulose solution and, after adding 1.50 ml of triethylamine, stirred at room temperature for 3 hours followed by heating at 75° C. for 1.5 hours. The reaction mixture was cooled, then 300 ml of isopropanol was added to precipitate the reaction product. The precipitates were filtered off, and washed well with isopropanol, after which they were purified by dissolving in water and then reprecipitating in methanol, and dried.

The physical properties obtained are as follows:
IR (film method): See FIG. 1.
$H^1$-NMR (solvent $D_2O$): See FIG. 2.

Figure 2:
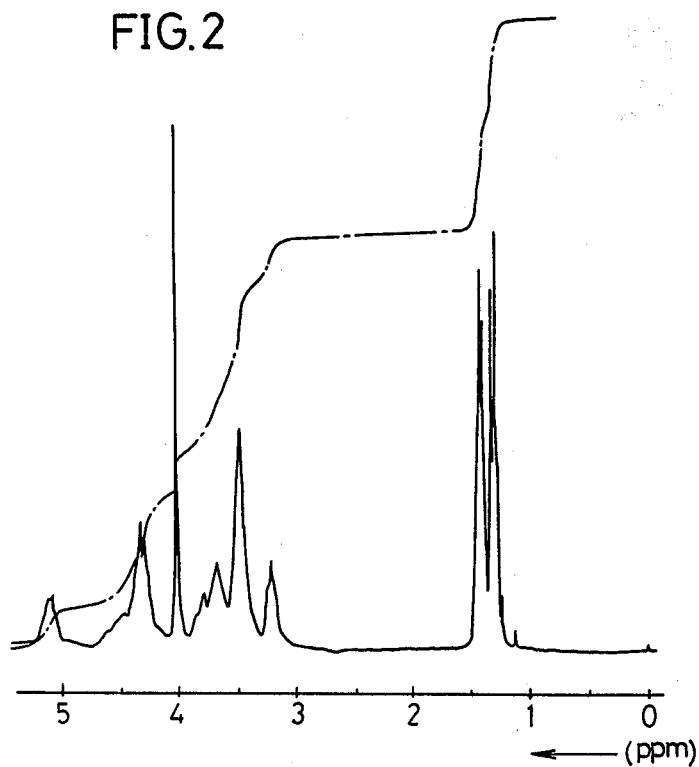
FIG. 2 shows an $H^1$-NMR spectrum of the cellulose ester derivative obtained in Example 1.

In FIG. 2, the two doublets at 1.3–1.4 ppm indicate the methyl protons of the opened and esterified lactide, and the respective peaks at 3–5.4 ppm indicate the protons of the same esterified lactide and the protons of the cellulose backbone, except the singlet at 4 ppm, which is attributed to the protons of water.

$C^{13}$-NMR (solvent $D_2O$): See FIG. 3.

Figure 3:
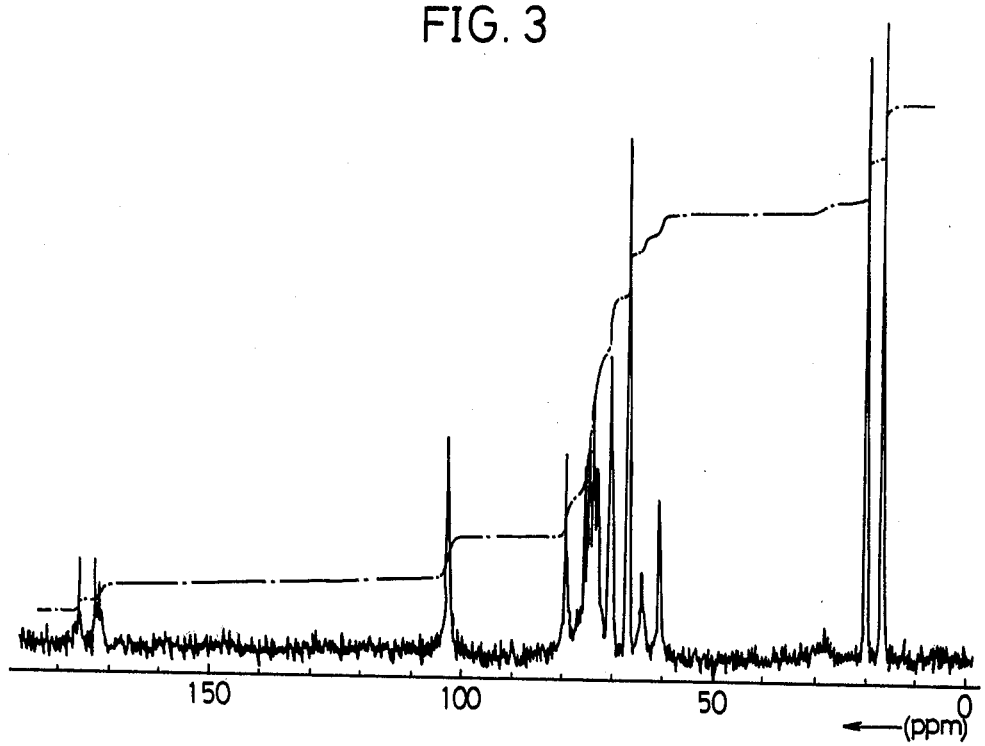
FIG. 3 shows a $C^{13}$-NMR spectrum of the cellulose ester derivative obtained in Example 1.

In FIG. 3, the peaks near 15–20 ppm indicate the methyl group carbons of the esterified lactide, the peaks near 67 and 70.5 ppm indicate the carbons adjacent to the methyl group carbons, and the others indicate the carbons of the cellulose backbone and the carbonyl carbons. Further, when this substance was dissolved in water added, then an excess amount of an aqueous sodium hydroxide solution was added to saponify it and the remaining sodium hydroxide was measured to determine the mole number of lactic acid added per glucose residue of this substance (degree of substitution), it was 1.4. This substance was soluble in water, dimethyl sulfoxide, N,N-dimethylacetamide, N-methyl-2-pyrrolidone etc.

EXAMPLE 2

Instead of the microcrystalline cellulose in Example 1, a sulfite process wood pulp having an α-cellulose content of 94% and a degree of polymerization of 800 was employed with the weight ratio of wood pulp:lithium chloride:N,N-dimethylacetamide of 9.1:26.4:262.8 to prepare a cellulose solution. 1.62 g of lactide was dissolved in 40.0 g of this cellulose solution, 1.00 ml of triethylamine was added, and the reaction was effected with stirring at 75° C. for 1.5 hours. After cooling, the post treatment similar to that in Example 1 was conducted. The cellulose ester derivative of the invention was obtained as an aqueous solution and its degree of substitution was 0.76.

EXAMPLE 3

A cellulose solution was prepared using the weight ratio of microcrystalline cellulose:lithium chloride:N,N-dimethylacetamide of 18.7:27.3:271.4 by similar procedures to those in Example 1. 2.21 g of glycolide was dissolved in 35.0 g of this cellulose solution, 1.76 ml of triethylamine was added thereto, and the reaction was effected by stirring at room temperature for 1.5 hours then at 55° C. for 4.5 hours. After cooling the reaction mixture, the post treatment similar to that in Example 1 was conducted.

Figure 4:
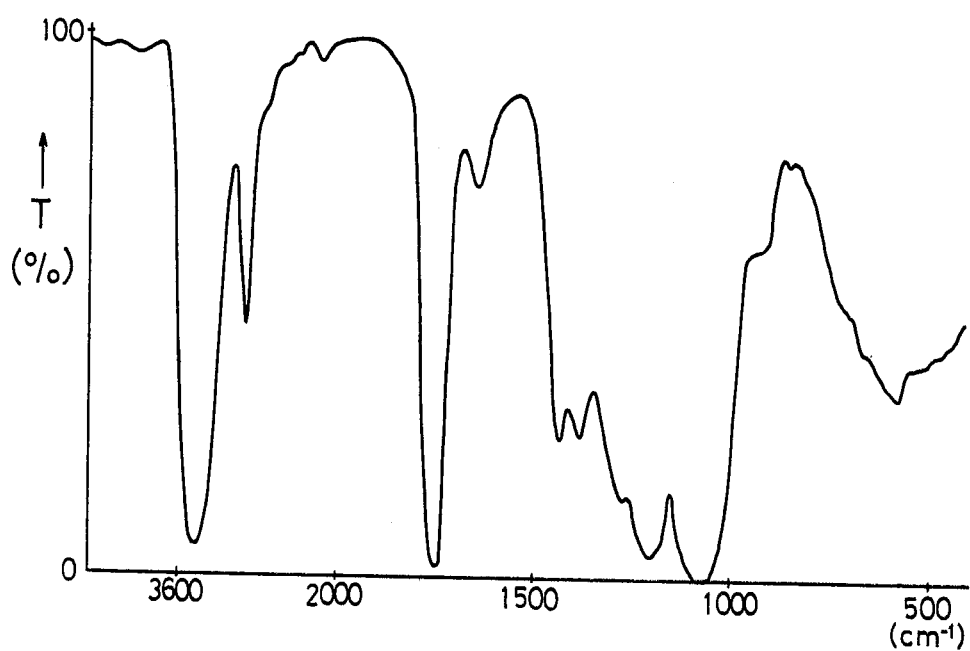
FIG. 4 shows an infrared absorption spectrum of the cellulose ester derivative of this invention obtained in Example 3.

The physical properties of the obtained substance are as follows:
IR (film method): See FIG. 4.
$H^1$-NMR (solvent $D_2O$): See FIG. 5.

Figure 5:
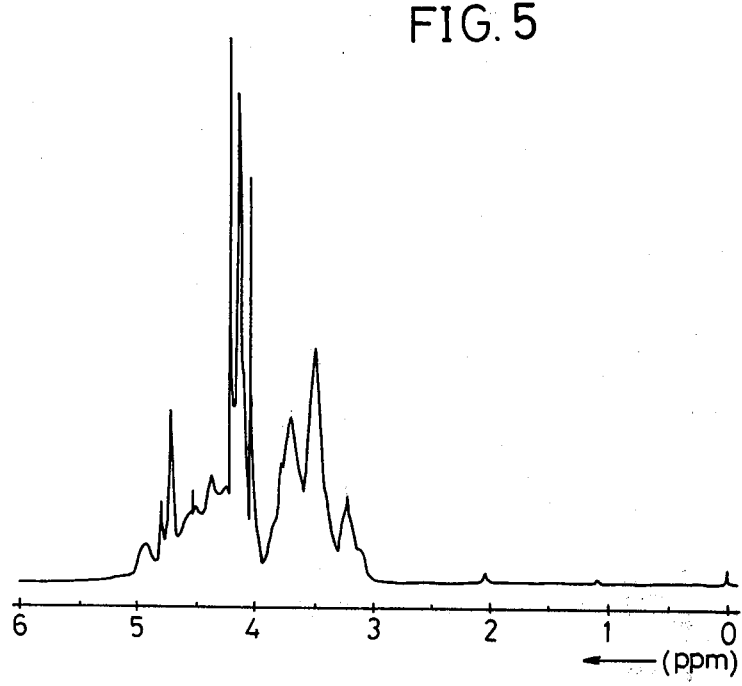
FIG. 5 shows an $H^1$-NMR spectrum of the cellulose ester derivative obtained in Example 3.

In FIG. 5, the peaks near 4.1–4.2 ppm indicate the methylene protons of the opened and esterified glycolide, and the others indicate the protons of the cellulose backbone.

$C^{13}$-NMR (solvent $D_2O$): See FIG. 6.

Figure 6:
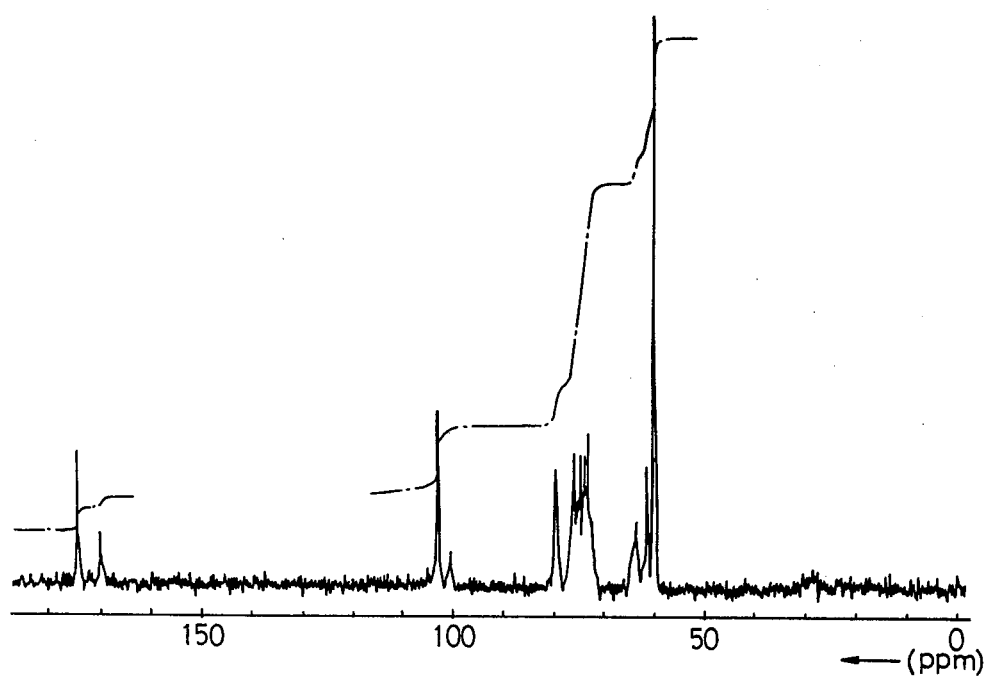
FIG. 6 shows a $C^{13}$-NMR spectrum of the cellulose ester derivative obtained in Example 3.

In FIG. 6, the two peaks near 61 ppm indicate the methylene group carbons of the same esterified glycolide, and the others indicate the carbons of the cellulose backbone and the carbonyl carbons.

Further, the mole number of glycolic acid added per glucose residue of this substance was measured to find 1.5. This substance was soluble in water, dimethyl sulfoxide, N,N-dimethylacetamide, N-methyl-2-pyrrolidone etc.

EXAMPLE 4

A cellulose solution was prepared using the weight ratio of wood pulp:lithium chloride:N,N-dimethylacetamide of 9.1:26.4:262.8 by similar procedures to those in Example 2. 4.92 g of glycolide was dissolved in 112.8 g of this cellulose solution, 5.9 ml of triethylamine was added thereto, and the reaction was stirred at room temperature for 3 hours. After allowing the reaction mixture to stand for 18 hours, the post treatment similar to that in Example 1 was conducted. The cellulose ester derivative of the invention was obtained as an aqueous solution, and the mole number of glycolic acid added was 1.4.

EXAMPLE 5

A cellulose solution was prepared using the weight ratio of microcrystalline cellulose:lithium chloride:N,N-dimethylacetamide of 18.7:27.3:217.4 by similar procedures to those in Example 1. 4.2 g of glycolide was added to 66.4 g of this cellulose solution and uniformly mixed, after which 0.5 g of anhydrous lithium hydroxide was added, and the reaction was effected by stirring at room temperature for 2.5 hours then at 65° C. for 2 hours. After cooling, the reaction mixture was poured onto methanol, the formed precipitates were washed with an 85% aqueous methanol solution, and dried by replacing by methanol. The mole number of glycolic acid added of this substance was 1.1.

EXAMPLE 6

A cellulose solution was prepared using the weight ratio of wood pulp:lithium chloride:N,N-dimethylacetamide of 10.8:25.8:257.1 by similar procedures to those in Example 2. 35.2 g of ε-caprolactone was added to 293.7 g of this cellulose solution and uniformly mixed, after which 6 ml of triethylamine was added thereto and stirred at 80° C. for 4 hours. After cooling, the reaction mixture was poured onto isopropanol, the formed precipitates were filtered off and washed well with isopropanol. Thereafter, they were dissolved in dimethyl sulfoxide, reprecipitated in acetone, then filtered off and dried.

Figure 7:
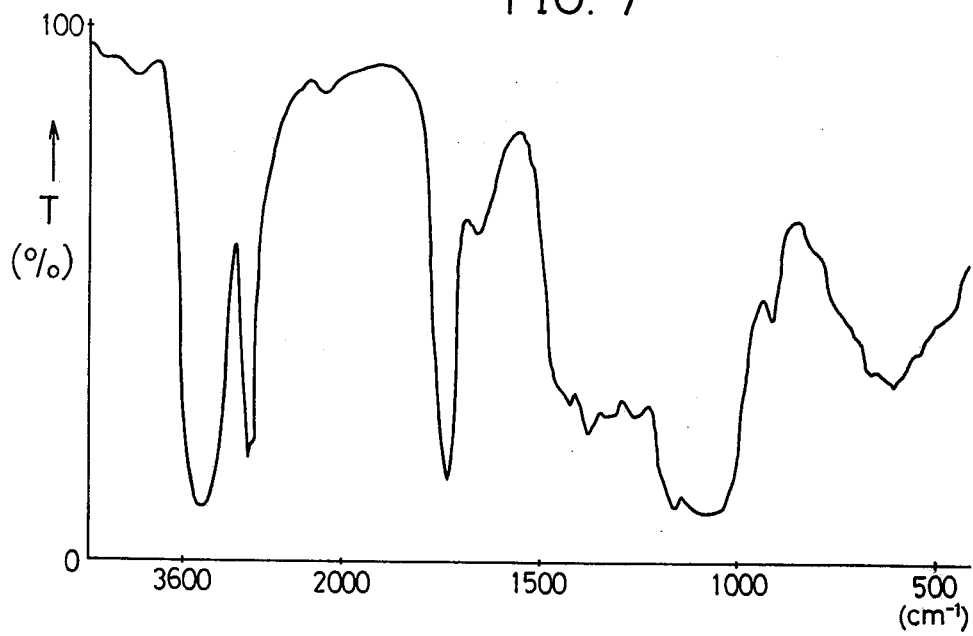
FIG. 7 shows an infrared absorption spectrum of the cellulose ester derivative of this invention obtained in Example 6.

The physical properties of the obtained substances are as follows:

IR (film): See FIG. 7.

Figure 8:
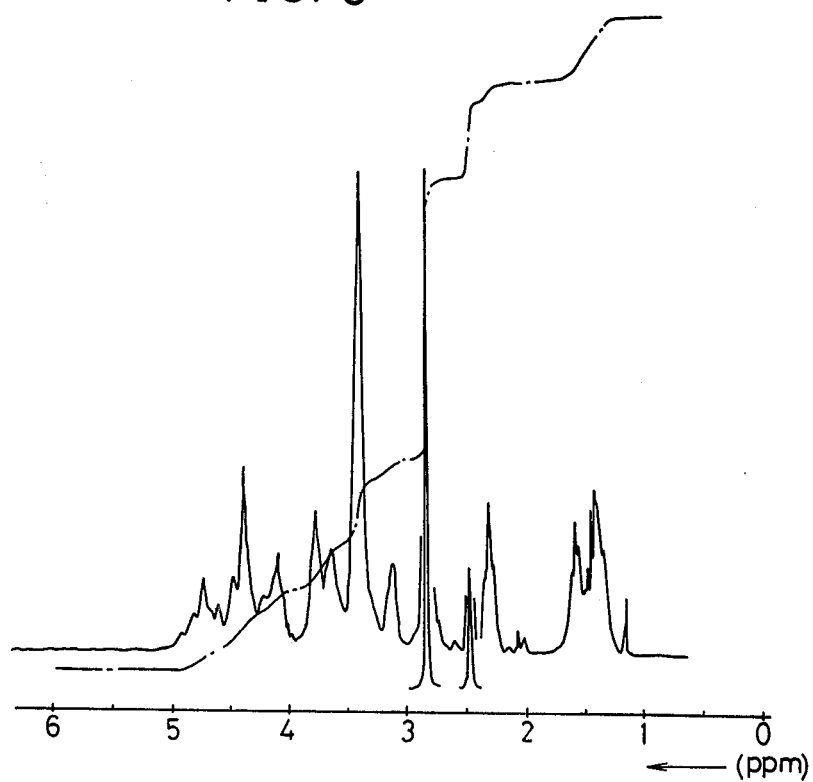
FIG. 8 shows an $H^1$-NMR spectrum of the cellulose ester derivative obtained in Example 6.

$H^1$-NMR (solvent $CD_3SOCD_3$): See FIG. 8.

In the figure, the peaks at 1.25–1.6 ppm indicate the methylene protons at the 2, 3 and 4 positions of the opened and esterified ε-caprolactone

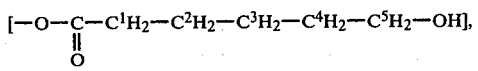

the peak at 2.3 ppm indicates the methylene protons at the 1 position, and the others indicate the cellulose backbones and the methylene protons at the 5-position.

Figure 9:
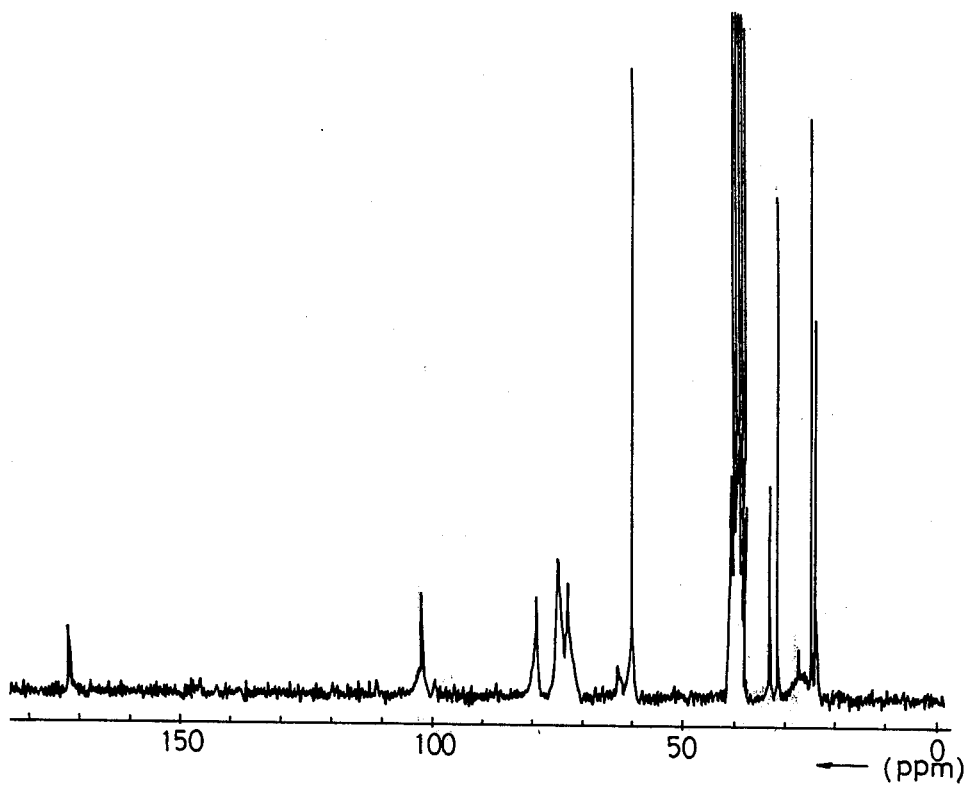
FIG. 9 shows a $C^{13}$-NMR spectrum of the cellulose ester derivative obtained in Example 6.

$C^{13}$-NMR (solvent $CD_3SOCD_3$): See FIG. 9.

In the figure, the peaks at 25–33 ppm indicate the methylene group carbons at the 1–4 positions of the same esterified ε-caprolactone, the peaks near 60 ppm indicate the cellulose backbone and the methylene carbon at the 5 position, the peak at 172 ppm indicates the carbonyl carbons, and the other peaks indicate the carbons of the cellulose backbone.

When this was saponified with an excess amount of an aqueous sodium hydroxide solution and thereafter the remaining sodium hydroxide was measured, the degree of substitution of this substance was 0.49. This substance was soluble in dimethyl sulfoxide.

What we claim is:

1. A cellulose ester derivative containing at least a moiety of the general formula (I):

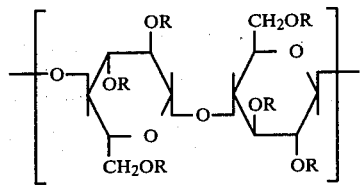

wherein at least one of the R groups is either a group of the formula (II):

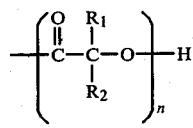

wherein $R_1$ and $R_2$ are independent from each other and each represents a hydrogen atom or a lower alkyl group and n represents an even number of 2–10; or a group of the formula (III):

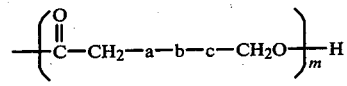

wherein a, b and c are independent from one another and each represents an oxygen atom or a methylene group, except the case where the oxygen atoms are adjacent to each other, and m represents an integer of 1–5; these groups optionally being present as a mixed ester, and the rest of the R groups represent hydrogen atoms.

2. A cellulose ester derivative of claim 1 in which the group of the formula (II) is a residue of glycolide, lactide, 2-hydroxy-n-butyric acid cyclic dimer or 2-hydroxy-isobutyric acid cyclic dimer.

3. A cellulose ester derivative of claim 1 in which the group of the formula (III) is a residue of ε-caprolactone.

4. A cellulose ester derivative of claim 1 in which the degree of substitution of the substituent R in the formula (I) is 0.1–3.0 per glucose residue.

5. A cellulose ester derivative of claim 1 in which the degree of substitution of the substituent R in the formula (I) is 0.4–2.0 per glucose residue.

6. A cellulose ester derivative of claim 1 in which the degree of polymerization is about 30–5000 as glucose units.

7. A process for the production of a cellulose ester derivative which comprises reacting cellulose with a compound of the formula (IV):

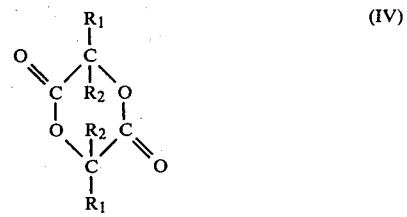

wherein $R_1$ and $R_2$ are independent from each other and each represents a hydrogen atom or a lower alkyl group; and/or a compound of the formula (V):

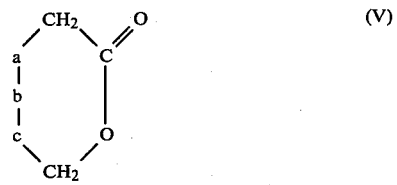

wherein a, b and c are independent from one another and each represents an oxygen atom or a methylene group, except the case where the oxygen atoms are adjacent to each other; in a solvent in the presence of an esterification promoting catalyst to obtain a cellulose ester derivative containing at least a moiety of the formula (I) of claim 1.

8. A process of claim 7 in which the solvent is a mixed solvent of N,N-dimethylacetamide, N-methyl-2-pyrrolidone or 1,3-dimethyl-2-imidazolidinone or a mixture thereof mixed with lithium chloride.

9. A process of claim 7 in which the esterification promoting catalyst is an alkali metal hydroxide such as sodium hydroxide, potassium hydroxide, or lithium hydroxide, or an amine such as pyridine, picoline, trimethylamine or triethylamine.

10. A process of claim 7 in which the compound of the formula (IV) is glycolide, lactide, 2-hydroxy-n-butyric acid cyclic dimer or 2-hydroxy-isobutyric acid cyclic dimer.

11. A process of claim 7 in which the compound of the formula (V) is ε-caprolactone.

* * * * *